United States Patent [19]

Costa

[11] 4,364,798

[45] Dec. 21, 1982

[54] REBUILT COKE OVEN HEATING CHAMBER AND METHOD OF MAKING THE SAME

[75] Inventor: Richard A. Costa, Mingo Junction, Ohio

[73] Assignee: BMI, Inc., Pittsburgh, Pa.

[21] Appl. No.: 221,310

[22] Filed: Dec. 30, 1980

[51] Int. Cl.³ .................. C10B 29/06; E04B 1/16; E04G 21/02; F27D 1/16
[52] U.S. Cl. .................. 202/267 R; 52/743; 52/746; 201/18; 264/30; 264/35
[58] Field of Search ............ 202/137, 223, 267 R, 202/267 A, 270; 201/18; 203/86; 13/35; 266/281; 52/743, 746; 264/30, 31, 35; 432/3

[56] References Cited

U.S. PATENT DOCUMENTS

| 2,476,305 | 7/1949 | Kimmel . | |
|---|---|---|---|
| 2,851,760 | 9/1958 | Taylor . | |
| 3,148,230 | 9/1964 | Behner et al. | 264/30 |
| 4,077,848 | 3/1978 | Gainer et al. . | |
| 4,127,626 | 11/1978 | Kubo et al. . | |
| 4,143,104 | 3/1979 | Konijnenburg et al. . | |
| 4,189,457 | 2/1980 | Clement . | |

OTHER PUBLICATIONS

"Casting Large Sections of Basic Refractories"; Kraner et al; Ceramic Bulletin; vol. 39, No. 9 (1960).

*Primary Examiner*—Bradley Garris

*Attorney, Agent, or Firm*—Stanley J. Price, Jr.; John M. Adams

[57] ABSTRACT

A spalled and deteriorated portion of a refractory brick heating wall of a coke oven heating chamber is dismantled. The deteriorated brick is removed with the undamaged brick remaining in place. Individual thermally destructable forms forming the gas flow passageways are vertically erected surrounding ports in the floor through which preheated gas and preheated air are separately supplied into the heating chamber. A second set of destructable forms having passageways forming the heating flues for receiving the products of combustion are positioned between the forms for the gas flow passageways. Horizontal forms, also forming gas flow passageways, connect adjacent vertical forms for the flow of air and gas from the ports into the heating flues where combustion of the air and gas takes place. When the thermally destructable forms are in place, a refractory material is sprayed onto the outer surfaces of the forms. The refractory material is built up on the forms to replace the removed bricks to reconstruct the portion of the heating chamber removed. The rebuilt portion is united by the refractory spraying with the brickwork of the original heating chamber that remains to form the rebuilt portion of the heating chamber integral with the original brick portion of the heating chamber. The heat generated by the products of combustion of the air and gas disintegrate the destructable forms leaving the formed and solidified refractory replacement portion of the coke oven heating chamber.

15 Claims, 10 Drawing Figures

REBUILT COKE OVEN HEATING CHAMBER AND METHOD OF MAKING THE SAME

BACKGROUND OF THE INVENTION

1. Field of the Invention

This invention relates to a rebuilt portion of a coke oven heating chamber and more particularly to a method of rebuilding a damaged portion of a coke oven heating chamber by removing deteriorated refractory brick and replacing it by the spraying of refractory material in surrounding relation with thermally destructable forms constructed to form the passageways that convey the flue gas through the heating chamber.

2. Description of the Prior Art

Coke oven batteries include a number of horizontal coke ovens that range up to twenty feet in height and up to fifty feet in length. An oven is approximately eighteen inches wide. Individual ovens are laterally arranged in groups to form a battery. A coke oven has a chamber with opposite open ends closed by doors. Positioned on both sides of a coke oven chamber are heating walls.

Internally of the heating walls are vertical heating flues in which combustion of air and gas takes place and the combustion products are exhausted through the heating flues vertically to a horizontal flue. The products of combustion pass along the horizontal flue and are drawn downwardly through additional heating flues on the other half of the coke oven. Heat is then supplied to the coking chambers from the adjacent heating flues through the heating walls.

The heating walls are heated to an elevated temperature to carry out the coking process. However, the heating walls adjacent the coke oven doors are cooled each time the doors are opened to push the coke from an oven chamber. Consequently, portions of the heating walls are subjected to thermal shock resulting in contraction and expansion of the refractory brick forming the heating walls, particularly the brick adjacent the coke oven doors.

The coke oven doors at both the pushing side and coking side are closed when coal is being coked within the coke oven chambers. These doors are removed when the coke is to be pushed out of the ovens. It is at this time when the refractory brick adjacent the doors are subjected to the maximum thermal shock by cooling of the brick. This causes expansion and contraction of the bricks results in spalling, deterioration, and eventually disintegration of entire brick sections of the heating walls.

U.S. Pat. No. 2,476,305, discloses repair of disintegrated coke oven walls by replacing the old refractory brick with new refractory brick. When the oven walls are to be repaired, heating of the flues at each side of an oven is discontinued and a bulkhead is placed within the oven back of the section to be repaired to shield the workmen from the heat of the walls. The new bricks are laid in courses and tied into the original brick. Such a process is laborious, expensive, and time consuming.

Is is also well known in the iron and steel industry to repair not only cracks in the refractory walls of a coke oven but the refractory walls or lining of a steel making furnace. The cracks are sealed and the refractory surface is relined by a gunning application of a refractory material. The refractory material is formed by mixing a dry mix of refractory binder and aggregate propelled through a hose by a stream of compressed air to a nozzle where a wetting agent, such as water, is supplied for mixture with the dry refractory to form a refractory product in a slurry. The refractory product in slurry form is operable to be sprayed on the interior surface of the coke oven walls for an oven removed from service. It is also known to seal leaks around a closed coke oven door by spraying while the coke oven remains in operation, as illustrated in U.S. Pat. No. 4,189,457.

Similarly it is known to reline the interior surface of a furnace by disposing a spray pipe and nozzle within the furnace. The spray nozzle is directed to spray refractory material into the abraded, eroded, and spalled areas of the refractory lining within the furnace. U.S. Pat. No. 4,127,626 discloses a known apparatus for repairing the lining of a furnace.

U.S. Pat. No. 4,143,104 discloses a method for repairing cracked coke oven walls wherein a gunning composition is applied to a damaged wall portion while the wall portion is at an elevated temperature. After the coke oven chamber is emptied, cracks in the surface of the interior walls are sealed by applying a gunning composition while the wall surfaces are at an elevated temperature. This procedure, however, is not applicable to repair of the heating chamber including heating flues within the walls separating adjacent oven chambers. Due to the thermal shock to which the brickwork of the heating flues are exposed at the ends of a coke oven, the heating flues are destroyed. Because the heating flues are within the heating chamber, repair by external spraying only is successful for internal repair thereby requiring dismantling of the old brick and installation of new brick.

U.S. Pat. No. 4,077,848 discloses apparatus for patching the interior walls and roof of a coke chamber oven by a gunning apparatus mounted on the pusher machine used in removing a charge of coke from the coke oven. By mounting the gunning apparatus directly on the pusher machine, the patching of the cracks is accomplished subsequent to the pushing of the coke from the oven. The patching or sealing composition is sprayed from nozzles located on the head of the pusher ram while the ram moves through the empty coke oven chamber. With this arrangement it is not necessary to permit the coke oven to cool to the extent that workmen may approach closely enough to work on the cracked areas.

It is also well known in the art of repairing the walls of a coke oven to repair leaks in the gas gun and other tubular refractory passages of the coke oven while the refractory brick is still hot and without withdrawing the coke oven from service. U.S. Pat. No. 2,851,760 discloses the penetration of refractory patching material in crevices of the gas gun to restore the refractory material forming the gas gun to seal the gun from gas leaks. The section of the gas gun to be repaired is first dammed off or plugged with a friable plastic material. The plastic dam is expanded into engagement with the hot walls of the gas gun. Thereafter a slurry of leak sealing material is introduced under pressure into the gun and forced into the cracks and crevices to be sealed. The openings from the gas gun to the fuel nozzles are also plugged. One of the members comprising the dam or plug for locating the application of the refractory within the gas gun is an abutment made of wood. During the repair operation, the wood abutment is burned out. After the refractory material has hardened in the cracks, the friable plastic dam and any other foreign solid material which may include the charred wood abutment or portions of the charred wood abutment are removed. Finally the gun opening is reamed or abraded to the desired size to remove excess refractory formed on the inside of the gas gun.

While it has been suggested to repair the damaged interior walls of a coke oven chamber by spraying of refractory material into the cracks in the brickwork and also to gun apply sealing material in crevices of refractory brick around the perimeter of a coke oven door, spray repairing is not suitable for repairing deteriorated bricks forming the interior heating flues within the heating chambers between the coke oven chambers. The present day practice of repairing the damaged heating walls adjacent the coke oven doors by replacing old brick with new brick is laborious and expensive. Therefore, there is need to provide a method of rebuilding the heating walls of a coke oven that does not require the laborious operation of replacing damaged brick with new brick.

SUMMARY OF THE INVENTION

In accordance with the present invention there is provided a method of rebuilding a portion of the heating chamber of a coke oven that includes the steps of removing a damaged portion of the coke oven heating chamber. Thereafter a thermally destructable form is erected in a position corresponding to the position of a gas flow passageway in the removed portion of the heating chamber. A passageway is formed by the thermally destructable form in the position of the removed gas flow passageway. Refractory material is applied to surrounding relation with the thermally destructable form to build at least a portion of the gas flow passageway in the portion of the removed heating chamber and form a rebuilt portion of the heating chamber integral with the original undamaged portion of the heating chamber.

Further in accordance with the present invention, there is provided a coke oven that includes a heating chamber and a coking chamber. The heating chamber includes a wall portion forming a passageway for the conveyance of gas through the heating chamber to heat the coking chamber. A first portion of the heating chamber is formed by brickwork and a second portion of deteriorated brickwork is removed. A reconstructed portion of the heating chamber is positioned in place of the second portion of the deteriorated brickwork. The reconstructed portion is formed of a refractory material applied in a configuration to rebuild the wall portion and the passageway of the second, removed portion. The reconstructed portion is connected to the brickwork of the first portion to form the reconstructed portion integral with the first portion and thereby form a unitary rebuilt portion of the heating chamber.

Preferably, in repairing a heating chamber of a coke oven the spalled and deteriorated portion of a heating wall forming a portion of the heating chamber is torn down to the supporting structure of the wall thereby exposing the ducts through which preheated gas and air are separately supplied for mixing of the gas and air in the heating flues formed within the heating chamber between the coke oven chamber. Generally the spalling of a heating wall begins adjacent the open ends of the coke oven where the thermal stresses are the greatest. The spalling then progresses rearwardly a distance from the oven open end to a point where the heating wall is not damaged. Therefore the damaged section of a heating wall to be repaired, i.e. from the open ends of a coke oven rearwardly a preselected distance from the open ends, is dismantled.

The forms are constructed of thermally destructable framing members and are erected in a preselected configuration so as to reconstruct the original gas and air ducts and heating flues within a heating chamber. In one embodiment frames are constructed to form exit slots for separate flow of preheated air and gas from reconstructed ducts into the reconstructed heating flues at various elevations along the vertical heating flues. In another embodiment the frame members are constructed to form a plurality of individual heating flues separated from one another where the products of combustion of mixed air and gas rise vertically upwardly within the heating flues. The surrounding heating walls of the heating chamber are heated and the heat transferred through the heating walls to the interior of the coke oven.

The exterior wall surfaces of the portion of the heating chamber being rebuilt are tied into the original refractory brick of the undamaged portion. Thus the rebuilt portion and the original portion form a continuous and homogeneous heating wall progressing from adjacent open ends of the coke oven to the original undamaged brick portion. Also an intermediate portion of a heating chamber spaced from the end portions of the heating chamber adjacent the pusher side and the coke side are capable of being repaired as well in accordance with the present invention.

Preferably the refractory material is gun applied in surrounding relation with the thermally destructable forms. The form passageways are constructed to form the vertical heating chambers or flues and air and gas ducts, each having a cross sectional area corresponding to the cross sectional area of the structure of the undamaged brick portion. The refractory material is gun applied to build up the thickness of the replaced portion of a wall of the heating chamber corresponding to the thickness of the original and remaining brick portion of the same wall.

When the gunning application of the refractory material in surrounding relation with the erected forms is complete, the flues for supplying the combustion products of air and gas to the rebuilt portion of the heating chamber are reactivated. Because of the elevated temperature of the gaseous products of combustion, the forms are destroyed. The newly formed refractory walls remain in surrounding relation with the rebuilt ducts and flues. The forms are constructed of a thermally destructable material, as for example wood, or any other suitable material that is destroyed when exposed to the operating temperatures within a coke oven heating wall.

It will be apparent that not only can the wall portions forming the heating chamber separating adjacent coke ovens and forming the ducts surrounding the heating flues be rebuilt in accordance with the present invention but other portions of a damaged coke oven can be similarly rebuilt. For example, the spalled and deteriorated horizontal flue connecting the top of the vertical heating flues can also be rebuilt by erecting forms on top of the walls of a rebuilt portion and spraying the refractory material in surrounding relation with the forms until walls surrounding the forms are formed of a thickness corresponding to the thickness of the original brick walls which were removed. Again by utilizing thermally destructable forms to rebuild the horizontal flues, the forms are destroyed once the flues are returned to service. The formed refractory material remains to provide a preselected replacement portion of a coke oven heating chamber at any location along the length of the heating chamber and from the floor of the heating chamber upward to the horizontal heating flue.

Accordingly, the principal object of the present invention is to provide a method of rebuilding the walls of a coke oven heating chamber by restoring the walls to their original operational characteristics without requiring the wall to be rebuilt by replacement of the individual refractory bricks.

Another object of the present invention is to provide a rebuilt portion of a coke oven heating chamber and a method of rebuilding the deteriorated heating walls of a coke oven heating chamber by the removal of the deteriorated portions of the heating walls and replacing them with newly formed heating walls of refractory material applied by a gunning application.

A further object of the present invention is to provide a method of reconstructing preselected portions of a coke oven heating chamber to restore the heating chamber to original operational capability without time consuming replacement of brick or by temporary sealing of cracks in the brick walls.

These and other objects of the present invention will be more completely disclosed and described in the following specification, the accompanying drawings, and the appended claims.

DESCRIPTION OF THE PREFERRED EMBODIMENTS

Figures 7, 8:
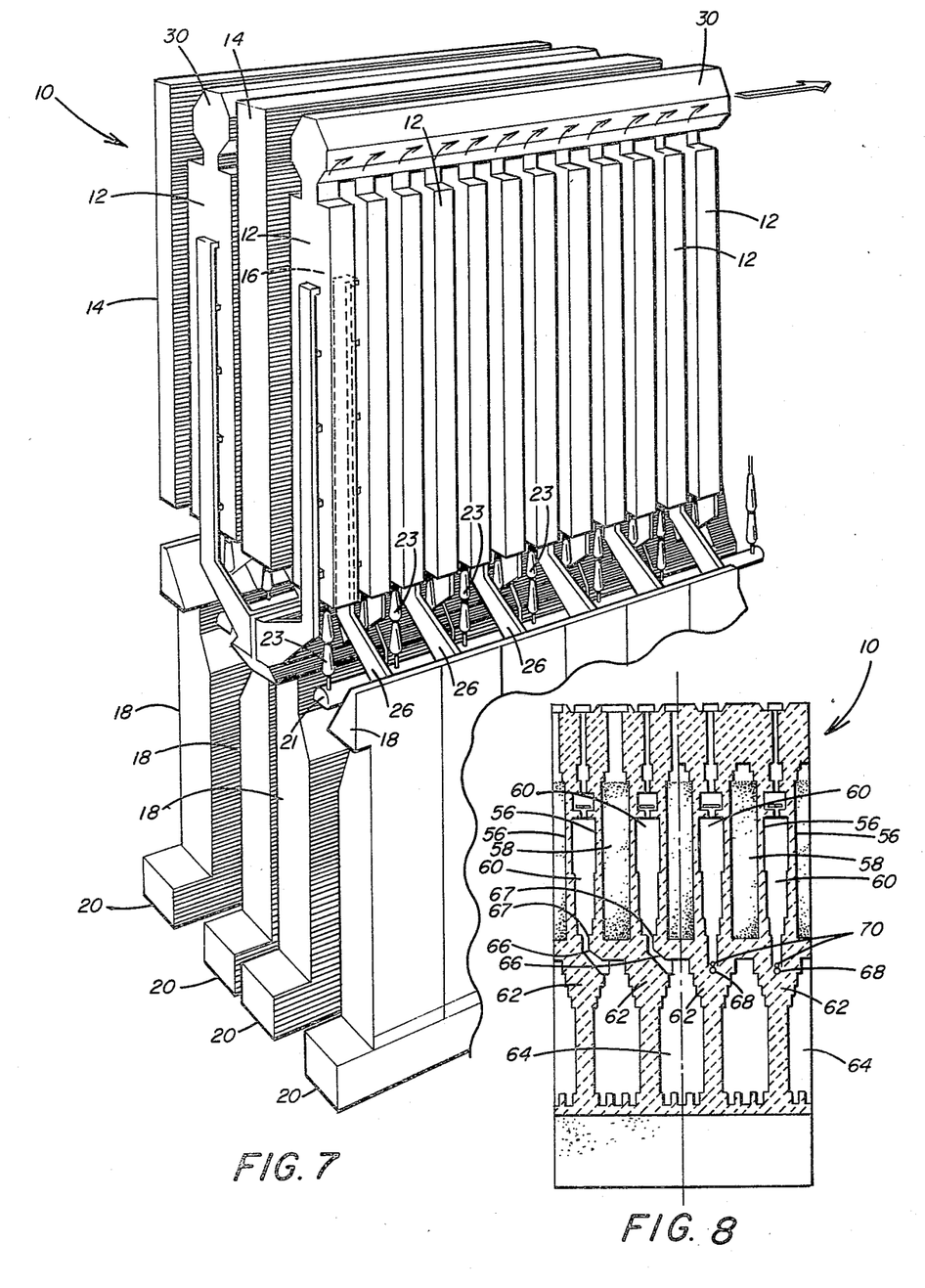
FIG. 7 is a schematic perspective view of a coke oven battery having refractory heating walls capable of being rebuilt in accordance with the method of the present invention.
FIG. 8 is a fragmentary longitudinal section through part of a coke oven battery illustrating one section through the air ports and an additional section through the gas ports and coke oven chambers separated by heating walls replaceable upon deterioration in accordance with the present invention.

Referring to the drawings and initially to FIG. 7 there is illustrated a known coke oven battery generally designated by the numeral 10 that includes a plurality of heating chambers 12 and a plurality of intermediate coking chambers 14. The heating chambers 12 form heating walls for the respective coking chambers therebetween. Within the heating chambers 12 are heating flues or gas flow passageways 16 to supply heat to the coking chambers 14. The heating chambers walls are supported by regenerators pillar walls 18 positioned therebeneath. The pillar walls 18 extend crosswise of the coke oven battery 10 and lengthwise of the coking chambers 14.

Figures 1, 2:
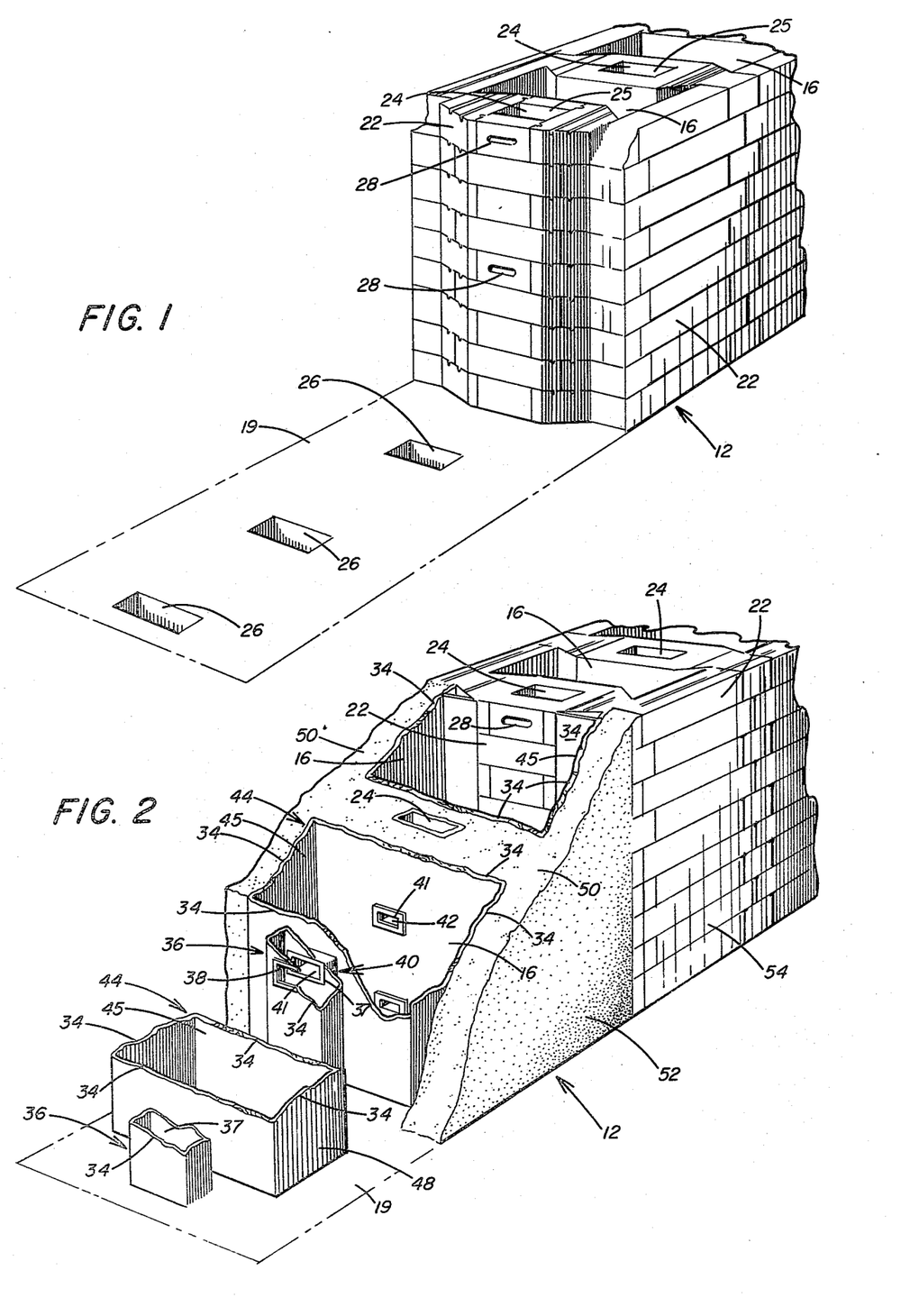
FIG. 1 is a schematic perspective view of a portion of a heating chamber of a coke oven, illustrating the refractory brick comprising a spalled and deteriorated portion having been removed with the undamaged portion remaining for rebuilding of the removed deteriorated portion.
FIG. 2 is a fragmentary schematic perspective view of a rebuilt portion of the coke oven heating chamber shown in FIG. 1, illustrating the various construction stages of rebuilding a portion of the heating chamber and joining the rebuilt portion with an undamaged portion of the heating chamber.

The coke oven battery 10 has a base portion 20 that supports the pillar walls 18 and the coking chambers 14 and the heating chambers 12 thereabove. The coke oven battery illustrated in FIG. 7 is exemplary of the type of battery that utilizes multi-stage heating. With this arrangement as illustrated in FIG. 1 the heating chamber walls are constructed of refractory bricks 22 tied together by the tongue and groove joints of overlying bricks. The heating flues or passageways 16 are divided from one another longitudinally by alternating vertical air and gas ducts 24 formed by the joined bricks 22. The vertical air ducts 24 communicate with air ports or passageways 26 extending through the regenerator pillar walls 18 and a floor 19 that serves as a base for the walls of the respective heating chamber 12. Gas is supplied to the vertical gas ducts 24 through a distribution channel 21 to the respective gas nozzles 23 which communicate with the gas ports 26. The vertical gas and air ducts 24 are formed by hollow openings 25 in the bricks 22.

Spaced at preselected intervals along the vertical height of the ducts 24 are exit slots 28 that emerge from both sides of the bricks 22 forming the vertical ducts 24. The exit slots 28 communicate with the vertical ducts 24. The ducts 24 receive preheated gas and preheated air alternately along the battery 10. The exit slots 28 for both air and gas are located opposite each other at regular vertical intervals on the refractory bricks 22. With this arrangement, the air and gas meet at each level and combustion takes place in the passageways 16 of the heating chambers 12. With this arrangement in a multi-stage type coke oven battery uniform distribution of heat is provided along the entire height of the heating chambers 12. The gas and air alternately flow through the ports 26 into the vertical ducts 24 and outwardly through the exit slots 28 into the heating chambers 12 where combustion takes place. The products of combustion from the heating chambers 12 rise up into a horizontal flue 30 illustrated in FIG. 7.

A partition wall (not shown) runs longitudinally through the coke oven battery 10 to divide the regenerators 18 and vertical heating chambers 12 into two parts. Each part represents one half of a coke oven chamber 10. Combustion of the gas and air takes place in one half of the respective heating chamber 12 with the products of the combustion flowing along the horizontal flue 30 and down through the other half of the respective heating chamber 12 through the regenerators 18 and into a waste gas flue (not shown). With the above arrangement the coke side and the pusher side of each coking chamber 14 are heated alternately by automatically reversing the flow of gas and air in a predetermined cycle. The opposite ends of each coking chamber 14 are open. The openings are closed by doors when coal is being coked within the coking chamber 14. The doors are removed when the coke is to be pushed out of the chamber 14. At this time the heating walls 12 adjacent the ends of the chamber 14 are cooled below 1500° F. Consequently, the refractory brick adjacent the ends of the coking chambers 14 are subjected to expansion and contraction.

This thermal action results in spalling of the refractory brick and after repeated cycles of expansion and contraction the bricks deteriorate. Spalling of the refractory brick also reduces the thickness of the heating walls of the heating chambers 12 particularly adjacent the open ends of the coking chambers 14. Consequently, the coal charged in the coking chambers 14 is subjected to uneven heating at the ends of the coking chambers 14. Also the formation of cracks in the refractory brick permits the combustion gases to enter the coking chambers 14 and this reduces the efficiency of the coking process.

In accordance with the present invention, the spalled and deteriorated portions of the heating walls of the heating chambers 12 are rebuilt so that the coking chambers 14 can be returned to their original operating efficiency. In order to repair the damaged heating walls between the coking chambers 14 the damaged portions are preferably removed down to the floor 19 upon which the bricks 22 are initially laid. However, if desired, portions of the damaged brickwork can be retained in place on the floor 19 to serve as a foundation for the rebuilt portions.

As illustrated in FIG. 1 a damaged portion has been completely removed and, for example, the first three vertical ducts 24 back from the coke oven door have been dismantled. The brickwork of the remaining heating chamber 12 is the undamaged section. Thus the deteriorated portions of the heating chamber 12 are removed until undamaged brickwork is exposed. Prior to the removal of the damaged portion of the heating chamber 12 the coke oven is removed from service and the flow of air and gas through the exposed ports 26 in the floor 19 is terminated to provide a safe environment for workmen. Additional protection may be utilized to protect the workmen from the adjacent heating chambers 12 that remain operable during the rebuilding of the damaged portions of the respective heating chamber 12.

As illustrated in FIG. 2 the removed portion of the heating chamber 12 is rebuilt by assembling together a plurality of framing members 34 fabricated of a preselected thermally destructable material, for example wood framing members, or any other destructable material to reconstruct the heating chambers 12, the passageways 16, and the gas and air ducts 24. The framing members 34 are preassembled to construct forms 36, 40, and 44 corresponding in dimension to the gas and air ducts 26, the exit slots 28, and the passageways 16, respectively.

The vertical ducts 24 are formed by the framing members 34 arranged to construct the form generally designated by the numeral 36 in FIG. 2 with a passageway 37 extending the length of form 36. The forms 36 are provided with openings 38 corresponding to the exit slots 28 in the brick ducts 22. Extending from the openings 38 are horizontal forms 40 also formed by destructable framing members 34. The horizontal forms 40 are illustrated in greater detail in FIG. 3. Each horizontal form 40 extends from an opening 38 to an opening 42 formed in an enlarged form generally designated by the numeral 44. Each form 44 forms a gas flow passageway 16. With this arrangement, the alternating air and gas vertical ducts 24 connected by the passageways 16 are reconstructed. Preferably the height of the vertical forms 36 and 44 corresponds to the vertical height of a heating wall from the floor 19 to the horizontal flue 30.

Figure 3:
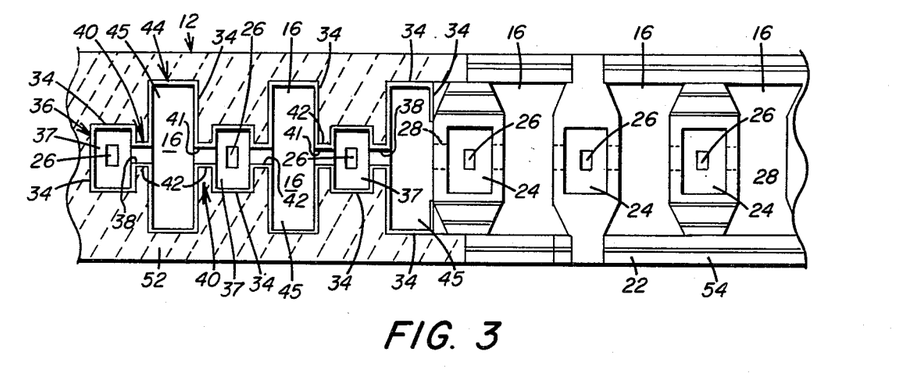
FIG. 3 is a top plan sectional view of a coke oven heating chamber, schematically illustrating a rebuilt portion of the heating chamber formed by the gunning application of refractory material into surrounding relation with thermally destructable forms erected adjacent an undamaged portion of the heating chamber.

Once the forms 36, 40, and 44 are constructed and suitably connected as illustrated in FIGS. 2 and 3 the refractory material to replace the refractory bricks 22 is installed by gunning a refractory material in a slurry form in surrounding relation with the framing members 34 of each form 36, 40, and 44. The refractory material replacing the removed refractory bricks 22 is a gunning material of the type well known for sealing cracks in coke ovens and relining furnaces. The refractory material possesses the desired expansion and contraction properties of the refractory bricks 22.

A refractory material suitable for use in carrying out the present invention is sold by BMI, Inc. of Pittsburgh, Pa. The refractory composition is preferably applied in a slurry form from a spray nozzle. The material is applied in surrounding relation with the forms 36, 40, and 44 thereby leaving passageways 37, 41, and 45 (shown in FIG. 2). The passageways 37, 41 and 45 form the gas and air ducts 24, exit slots 28, and the passageways 16 respectively.

As the slurry of refractory material is applied in surrounding relation with the forms 36, 40, and 44 the thickness of the heating walls is built up on the lateral surfaces 48 of the forms. The material is continually applied until the material thickness on the lateral surfaces 48 corresponds to the thickness of the walls formed by the bricks 22. The refractory material is applied in a slurry form and is applied until a thickness 50 is developed forming a refractory wall 52 tied into the brick wall 54. With this arrangement, the rebuilt wall 52 is formed integral with the undamaged section of the brick wall 54. Thus a uniform planar surface for the coking chamber wall is formed by the combination of the undamaged refractory brick and the gunning refractory material.

FIG. 2 illustrates the progressive application of the refractory material around the forms from the remaining brickwork 54 out toward the open end of the coke oven. Then upon completion of the gunning operation as illustrated in FIG. 3, the rebuilt section 52 of the heating chamber 12 has the configuration of the original brickwork forming the heating chamber 12. Preferably the forms 36, 40, and 44 are erected in a manner to repeat the pattern of the original undamaged brick portion 54 of the heating chamber 12. Thus the rebuilt refractory section 52 of the heating chamber 12 has a configuration corresponding to the replaced brickwork of the heating chamber 12. The rebuilt refractory section 52 has heating properties corresponding to that of the original brick heating chamber 12.

Figure 4:
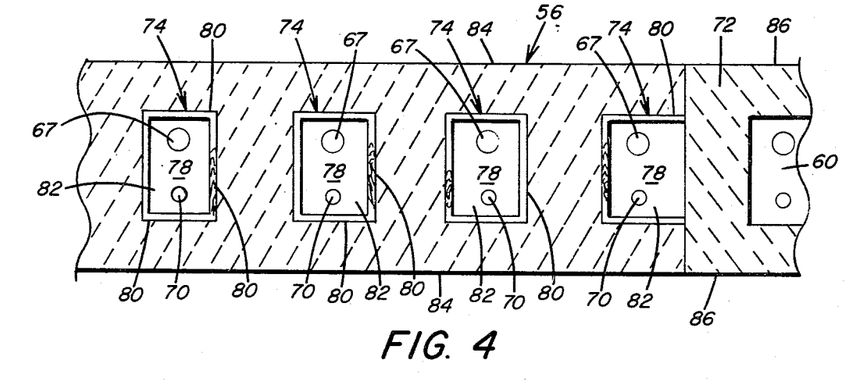
FIG. 4 is a view similar to FIG. 3, schematically illustrating another embodiment of a rebuilt portion of a heating chamber having individual heating flues spaced one from another by refractory material gunned in surrounding relation with the erected forms and tied into an adjacent undamaged portion of the heating chamber.

FIG. 4 illustrates another example of the manner in which the heating chambers 12 separating coking chambers 14 can be rebuilt in accordance with a preselected design of the heating walls. The design of the heating chambers 12 illustrated in FIG. 4 corresponds to the regenerative, single-divided type of coke oven shown in FIG. 8. As with the arrangement described above for FIG. 7, the coke oven battery 10 illustrated in part in FIG. 8 has a plurality of heating walls 56 and a plurality of coking chambers 58. The heating walls 56 form sidewalls for the coking chambers 58 therebetween and form heating chambers 60 to supply heat to the coking chambers 58. The heating walls 56 are supported by regenerator pillar walls 62 positioned therebeneath. The pillar walls 62 extend crosswise of the coke oven battery 10 and lengthwise of the coking chambers 58.

Positioned beneath the heating chamber 60 are regenerator chambers 64 through which combustion air is heated and circulated to the "on" flues and waste gas is removed from the "off" flue. As illustrated in the longitudinal section of FIG. 8 taken through the air ports 67, a passageway 66 extends from an air port 67 of each heating chamber 60 to the respective regenerator chamber 64. Combustion air flows through the regenerator chamber 64, is heated, and then flows through passageway 66 and into the heating chamber 64 where it is admixed with fuel gas for combustion therein. Further as illustrated in the section of FIG. 8 taken through the burners, a horizontally extending gas gun 68 is arranged within the furnace brickwork and is connected to a gas nozzle 70 in the base of each heating chamber 60. With this arrangement, the gas gun 68 supplies gas to the gas nozzle 70. It should be understood that the gas nozzles 70 and the air ports 67 are separated from one another on opposite sides of the respective heating chambers 60 so that the combustible mixture is not formed adjacent the gas nozzles 70. The air and gas flow upwardly through the respective companion heating chambers 60 and are admixed and burned.

The rebuilt section of a heating wall 56 for the coke oven battery illustrated in FIG. 8 is shown in FIG. 4. As illustrated in FIG. 4, a portion of the heating wall 56 has been rebuilt and joined with an undamaged brick section 72 of the heating wall 56. Once the spalled and deteriorated portions of the brick heating wall 56 have been removed down to the floor 78, the vertically extending forms generally designated by the numeral 74 are positioned in surrounding relation with the pairs of ports 67 and nozzles 70 in the floor 78. The forms 74 extend upwardly the height of the original heating chambers 60 to be rebuilt.

The forms 74 are also formed of individual framing members 80, such as wood, which are destroyed when the ports 67 and nozzles 70 are returned to operation and combustion takes place within the heating chambers 60. The framing members 80 are suitably connected to form the passageways 82. The passageways 74 encompass the pairs of ports 67 and nozzles 70. The passageways 82 extend upwardy from the floor 78 to the horizontal heating flue. The passageways 82 become the heating chambers 60.

Once the forms 74 are in place refractory material is applied by the gunning method in surrounding relation with the forms 74. The areas between adjacent forms 74 are filled. The refractory material is applied to the outer surfaces of the forms 74 to develope a thickness of the rebuilt section of the heating wall 56 corresponding to the undamaged section 72 of the heating wall 56. The gunning material is applied until outer surfaces 84 are tied into outer surfaces 86 of the undamaged brick section 72. The outer surfaces 84 are formed coplanar with the outer surfaces 86. At the interface of the rebuilt section and the undamaged section 72, the refractory material is tied into the brickwork of section 72. Thus the rebuilt section is formed integral with the undamaged brick section 72.

As above discussed when the forming operation is completed which can include troweling of the sprayed material on outer refractory surfaces 84, the rebuilt combustion chambers 60 returned to operation. Eventually the destructable forms 74 are consumed by the heat, and the solidified refractory walls 84 remain. The rebuilt section of the heating wall 56 possesses the desired heating characteristics of the remaining brick section 72.

Figure 5:
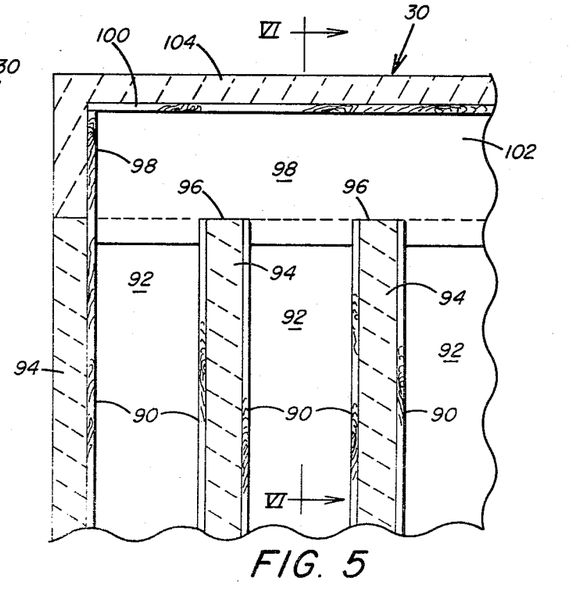
FIG. 5 is a fragmentary sectional view in side elevation of a rebuilt portion of a coke oven heating chamber, schematically illustrating a plurality of rebuilt vertical heating flues joined by a rebuilt portion of a horizontal flue connecting the upper ends of the heating flues.
Figure 6:
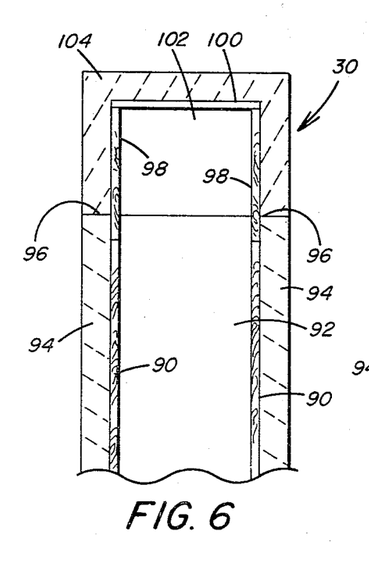
FIG. 6 is a sectional view taken along line VI—VI of FIG. 5, schematically illustrating the rebuilt portion of the horizontal flue above a rebuilt vertical flue.

Now referring to FIGS. 5 and 6, there is illustrated a further feature of the present invention which includes the reconstruction of a deteriorated horizontal flue 30 by the gunning application of refractory material on destructable frame members built in accordance with the dimension of the original horizontal flue 30. As described above with respect to the coke oven battery 10 illustrated in FIG. 7, the products of combustion from the heating flue 16 rise up into a horizontal flue 30. Each of the heating chambers 12 open into the horizontal flue 30 that extends longitudinally of the coke oven battery 10.

As illustrated in FIGS. 5 and 6, a plurality of vertical frame members 90 are assembled and positioned to form the vertical heating chambers 92. Refractory material is gun applied on the exterior surface of the vertical frame members 90 to form heating walls 94. As above described the heating walls 94 extend upwardly from the floor of the coking chamber to an upper edge 96 surrounding the heating chambers 92. The horizontal flue 30 is then constructed above the rebuilt refractory heating walls 94.

The horizontal flue 30 is formed by vertical frame members 98 abutting the lower vertical members 90 and extending a preselected height upwardly therefrom. The vertical members 98 abut a horizontal frame member 100. With this arrangement a passageway 102 extending horizontally above the heating chambers 92 is constructed. The refractory material is then gun applied on the top of the horizontal frame member 100 and on the exterior of the vertical frame members 98 to completely cover the frames 98 and 100 with refractory material 104. The refractory material 104 is applied to a thickness corresponding to the thickness of the lower heating walls and may be finished by troweling or by any other suitable methods.

As illustrated in FIG. 5, the vertical frame members 98, as well as, the horizontal frame member 100 have a preselected length corresponding to the length of the section of the horizontal flue 30 being rebuilt. Accordingly only that portion of the brickwork forming the horizontal flue 30 which has become deteriorated is removed and replaced by the refractory material 104. The refractory material 104 at the juncture of the rebuilt portion of the horizontal flue 30 with the original undamaged portion of the horizontal flue 30 is joined by adhesion of the refractory material to the brick thereby forming a unitary horizontal flue structure.

After the gunning material has solidified on the frame members 98 and 100 forming the horizontal flue, as well as, on the frame members 90 forming the heating chambers 92, the heating chambers 92 and the horizontal flue 30 are returned to service. With the frame members 90, 98 and 100 being constructed of a thermally destructable material, the heat of the products of combustion flowing upwardly through the heating chambers 92 and the horizontal flue 30 destroy frame members 90, 98, and 100. The formed and solidified refractory material 94 and 104 remains. Thus the deteriorated portions of the heating wall 12 and the horizontal flue 30 are rebuilt, and the coke oven is restored to its original operating efficiency.

FIGS. 3 and 4 illustrate the method of rebuilding the end portions of a heating chamber adjacent the open ends of a coke oven. The open ends at the coke side and the pusher side of a coke oven are normally closed by removable doors. The doors are removed to charge the coke oven and after the coking process is complete to push the coke out of the coke oven. Consequently, the portions of the heating chamber walls adjacent the coke oven open ends are exposed to maximum thermal shock resulting in deterioration of the refractory brick by cracking, separating, and the like. With the present invention the deteriorated brick is replaced by spraying refractory material on thermally destructable forms.

However, not only can the end portions or the end flues of a heating chamber of a coke oven be rebuilt or above discussed, but an intermediate portion of the heating chamber between the end portions can be rebuilt as well in accordance with the present invention. Also portions of a heating wall or a heating flue located at any point along the heating chamber can be rebuilt by spraying the refractory material on thermally destructable forms.

Figure 9:
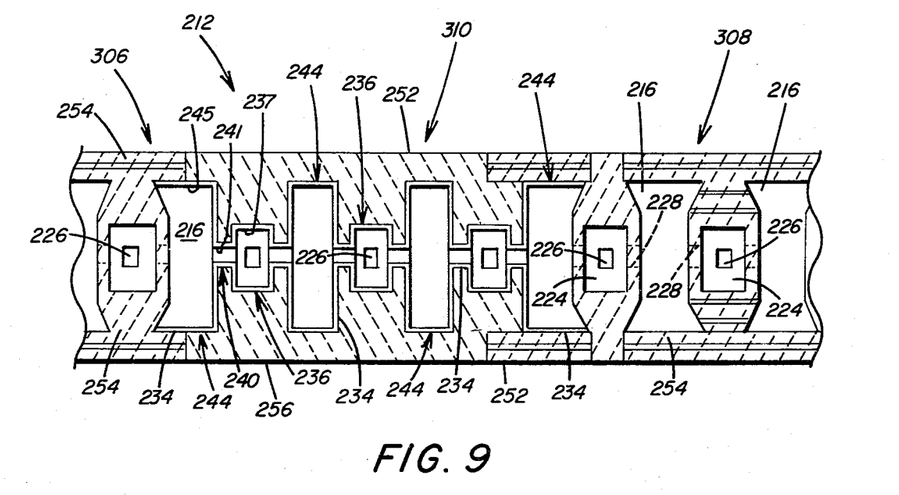
FIG. 9 is a top plan fragmentary sectional view of a portion of a heating chamber similar to FIG. 3, illustrating an intermediate portion of a heating chamber between the ends thereof being repaired in accordance with the present invention.
Figure 10:
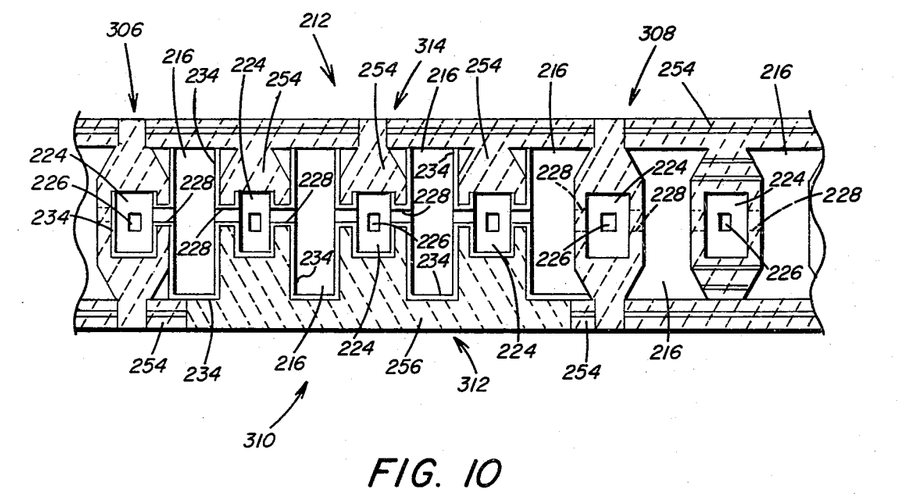
FIG. 10 is a view similar to FIG. 9, illustrating repair of one half of a heating chamber where the brick wall and a portion of the heating flues on one side of the heating chamber are retained while the opposite wall and the portion of the heating flues on the opposite side are rebuilt.

FIG. 9 illustrates the method of rebuilding an intermediate portion of a heating chamber between the end portions of the heating chamber. FIG. 10 illustrates the method of rebuilding a portion, such as one half, of an intermediate portion of the heating chamber. With reference to FIGS. 9 and 10, like numerals of FIG. 3 refer to like parts designated by numerals in FIGS. 9 and 10 raised by a factor of 200.

Referring to FIG. 9 there is illustrated the coking chamber 212 having wall surfaces 252. The coking chamber 212 includes a first end portion 306 and a second end portion 308 with an intermediate portion 310 therebetween. The first and second end portions 306 and 308 are formed by the original refractory brick walls 254. Thus for the intermediate portion 310 of original brickwork which has become deteriorated requiring repair, the damaged brickwork of the intermediate portion 310 is removed and the brickwork of the end portions 306 and 308 is retained in place.

The brickwork of the intermediate portion 310 is replaced by spraying refractory material, in the manner as above discussed, onto the erected thermally destructable forms 236, 240, and 244 forming gas flow passageways 237, 241, and 245 respectively. Each of the forms 236, 240, and 244 are formed by the individual frame members 234. The refractory material is spray applied onto the frame members 234 to build up a refractory heating wall 256 corresponding to the replaced brick heating wall. The refractory heating wall 256 of the intermediate portion 310 is tied into the brick heating walls 254 of the first and second end portions 306 and 308 of the heating chamber 212 to form the reconstructed intermediate portion 310 integral with the first and second end portions 306 and 308.

Now referring to FIG. 10 there is illustrated a reconstructed portion generally designated by the numeral 312 of the coke oven heating chamber 212. The reconstructed portion 312 is formed at the intermediate portion 310 of the heating chamber 212 so that the intermediate portion 310 includes a reconstructed portion 312 of sprayed-on refractory material and an original brick portion 314 which is not in need of repair and therefore is retained in place.

Initially the brickwork surrounding only the damaged portions of the gas flow paassageways 216, 224, and 228 of the intermediate heating chamber portion 310 are removed. The undamaged brick portions of the gas flow passageways 216, 224, and 228 are retained in place. The frame members 234 are assembled in a position to reconstruct the dismantled portions of the passageways 216, 224, and 228 and are positioned in abutting relation with the brick wall portions 254 that have been retained. In this manner approximately one half of the coking chamber intermediate portion 310 is reconstructed. The reconstructed portion 312 is tied into the brickwork 254 forming the portion of the passageways 216, 224 and 228 retained in place. Thus the refractory reconstructed portion 312 is formed integral with the brickwork 254 surrounding the passageways 216, 224, and 228 to thereby reconstruct portions of the heating wall of the intermediate portion 312 and portions of the gas flow passageways 216, 224, and 228.

Thus it will be apparent with the present invention that preselected portions of the haating chambers separating the coking chambers of a coke oven battery can be repaired without the need to replace deteriorated refractory brick with new brick. By spraying refractory material onto the thermally destructable forms, the rebuild operation is more efficiently conducted at a substantially reduced cost and in a shorter period of time than the conventional method of replacing deteriorated brick with new brick. The present invention also provides a versatile method which is adaptable for repairing any portion of a coke oven heating chamber and thereby return the coke oven to service in a much shorter period of time than possible when conventional methods are employed to repair a heating chamber.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:
1. A method of rebuilding a portion of the heating chamber of a coke oven comprising the steps of,
   removing a damaged portion of the coke oven heating chamber,
   erecting a thermally destructable form in a position corresponding to the position of a gas flow passageway in the removed portion of the heating chamber, forming a passageway by the thermally destructable form in the position of the removed gas flow passageway, and applying refractory material in surrounding relation with the thermally destructable form to rebuild at least a portion of the gas flow passageway in the portion of the removed heating chamber and form a rebuilt portion of the heating chamber integral with the original undamaged portion of the heating chamber.

2. A method of rebuilding a portion of the heating chamber of a coke oven as set forth in claim 1 which includes, erecting the thermally destructable form in surrounding relation with a duct for conveying gas into the removed portion of the coke oven heating chamber, gunning refractory material in surrounding relation with the form thereby forming the gas flow passageway surrounded by refractory material for the flow of gas therethrough, and thermally destroying the form by exposure to heat leaving a refractory rebuilt portion of the gas flow passageway in the coke oven heating chamber.

3. A method of rebuilding a portion of the heating chamber of a coke oven as set forth in claim 1 which includes, removing a damaged portion of a heating chamber from service, dismantling the deteriorated brickwork forming a portion of the heating wall and gas flow passageway of the damaged portion of the coke oven heating chamber, erecting the thermally destructable form in place of the dismantled brickwork forming the removed gas flow passageway, spraying refractory material in surrounding relation with the thermally destructable form to a preselected thickness, and thermally destroying the form leaving a rebuilt refractory portion replacing the deteriorated brickwork of a portion of the oven heating wall and gas flow passageway.

4. A method of rebuilding a portion of the heating chamber of a coke oven as set forth in claim 1 which includes, adhering the refractory material to the refractory brickwork of the undamaged portion of the heating chamber, applying the refractory material onto the form to rebuild a portion of the heating chamber to the dimensions of the original brickwork of the heating chamber, and forming a rebuilt portion of the heating chamber by uniting the applied refractory material with the brickwork.

5. A method of rebuilding a portion of the heating chamber of a coke oven as set forth in claim 1 which includes, shaping the exterior surface of the applied refractory material to a preselected configuration, and joining the applied refractory material to the adjacent surfaces of the undamaged portion of the heating chamber to form a rebuilt portion of the heating chamber corresponding in dimension to the removed portion of the heating chamber.

6. A method of rebuilding a portion of the heating chamber of a coke oven as set forth in claim 1 which includes, gun applying refractory material in slurry form to coat the exterior surfaces of the thermally destructable form with a preselected thickness of refractory material, and shaping the exterior surfaces to dimensionally conform to the removed portion of the coke oven heating chamber.

7. A method of rebuilding a portion of the heating chamber of a coke oven as set forth in claim 1 which includes, erecting a first set of thermally destructable forms to extend vertically a preselected height, erecting a second set of thermally destructable forms abutting the first set, positioning the second set horizontally relative to the first set, applying the refractory material on the surfaces of the first and second sets of forms, and thermally destroying the first and second sets of forms upon exposure to heat so that a unitary refractory portion of the rebuilt portion of the heating chamber is formed having a plurality connecting gas flow passageways.

8. A method of rebuilding the walls of a coke oven as set forth in claim 1 which includes, constructing the forms from wood to dimensions corresponding to the dimensions of the damaged portion having been removed.

9. A method of rebuilding a portion of the heating chamber of a coke oven as set forth in claim 1 which includes, removing the brickwork forming a portion of the heating chamber positioned adjacent a selected end of the coke oven, removing the brickwork forming a preselected number of gas flow passageways and adjacent heating wall portions from adjacent the selected end of the coke oven together with the removed portion of the heating chamber, exposing a plurality of gas flow ducts upon removal of the portion of the heating chamber to be rebuilt, erecting a plurality of thermally destructable forms in place of the removed brickwork originally forming the gas flow passageways in surrounding relation with gas flow ducts, and applying refractory material in surrounding relation with the forms to rebuild the gas flow passageways and adjacent heating wall portions of the portion of the heating chamber adjacent to the selected end of the coke oven.

10. A method of rebuilding a portion of the heating chamber of a coke oven as set forth in claim 1 which includes, removing the brickwork forming a portion of the heating chamber positioned intermediate the ends of the heating chamber of the coke oven, removing the brickwork forming a preselected number of gas flow passageways and adjacent heating wall portions of an intermediate portion of the coke oven heating chamber, exposing a plurality of gas flow ducts upon removal of the intermediate portion of the coke oven heating chamber, erecting a plurality of thermally destructable forms in place of the removed brickwork originally forming the gas flow passageways in the removed intermediate portion of the coke oven heating chamber, and applying refractory material in surrounding relation with the forms to rebuild the gas flow passageways and adjacent heating wall portions of the intermediate portion of the coke oven heating chamber.

11. A method of rebuilding a portion of the heating chamber of a coke oven as set forth in claim 1 which includes, removing a first portion of the brickwork forming the gas flow passageway in the portion of the coke oven heating chamber to be rebuilt with a second portion of brickwork forming the gas flow passageway remaining in place, erecting a thermally destructable form in place of the removed first portion of the brickwork of the gas flow passageway, abutting the thermally destructable form with the second portion of the brickwork remaining in place to reconstruct the original brickwork gas flow passageway, and applying refractory material in surrounding relation with the thermally destructable form and into contact with the second portion of the brickwork to form a unitary rebuilt gas flow passageway.

12. A coke oven comprising,
a heating chamber and a coking chamber,
said heating chamber including a wall portion forming at least one passageway for the conveyance of gas through the heating chamber to heat said coking chamber,
a first portion of said heating chamber being formed by brickwork and a second portion of deteriorated brickwork being removed,
a reconstructed portion of said heating chamber positioned in place of said second portion of said deteriorated brickwork,
said reconstructed portion being formed of a refractory material applied by spraying in a configuration to rebuild said wall portion and said passageway of said second, removed portion, and
said reconstructed portion being connected to said brickwork of said first portion to form said reconstructed portion integral with said first portion and thereby form a unitary rebuilt portion of said heating chamber.

13. A coke oven as set forth in claim 12 which includes,
a first end portion and a second end portion of said heating chamber,
an intermediate portion between said end portions,
said first and second end portions and said intermediate portion being originally fabricated of brickwork,
said brickwork of a damaged portion of a selected one of said end portions being removed so that said selected end portion is dismantled a preselected distance from said end portion toward said intermediate portion,
said reconstructed portion replacing said removed brickwork of said selected end portion, and
said refractory material of said reconstructed portion being tied into said brickwork of said intermediate portion adjacent thereto to form said reconstructed portion integral with said intermediate portion.

14. A coke oven as set forth in claim 12 which includes,
a first end portion and a second end portion of said heating chamber,
an intermediate portion between said end portions,
said first and second end portions and said intermediate portion being originally fabricated of brickwork,
a portion of said brickwork of said intermediate portion being damaged and removed,
said reconstructed portion replacing said removed brickwork of said intermediate portion, and
said refractory material of said reconstructed portion being tied into said brickwork of said first and second end portions adjacent thereto to form said reconstructed portion integral with said first and second end portions.

15. A coke oven as set forth in claim 12 in which,
said reconstructed portion is formed by a thermally destructable form erected to form said passageway for the flow of gas through said heating chamber,
said refractory material being initially supported by said form upon application of said refractory material, and
said form being capable of thermal destruction during the operation of said coke oven leaving said refractory material in place and integrally formed with said original brickwork of said heating chamber first portion.

* * * * *